US012732256B2

(12) United States Patent
Ganesan et al.

(10) Patent No.: US 12,732,256 B2
(45) Date of Patent: Sep. 8, 2026

(54) CONFIGURING A WAKEUP SIGNAL

(71) Applicant: Lenovo (Singapore) Pte. Ltd., New Tech Park (SG)

(72) Inventors: Karthikeyan Ganesan, Kronberg im Taunus (DE); Ankit Bhamri, Rödermark (DE); Vijay Nangia, Woodridge, IL (US); Ali Ramadan Ali, Kraiburg am Inn (DE); Sher Ali Cheema, Ilmenau (DE); Abir Ben Hadj Fredj, Frankfurt am main (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 546 days.

(21) Appl. No.: 18/022,420

(22) PCT Filed: Aug. 20, 2021

(86) PCT No.: PCT/IB2021/057687
§ 371 (c)(1),
(2) Date: Feb. 21, 2023

(87) PCT Pub. No.: WO2022/038576
PCT Pub. Date: Feb. 24, 2022

(65) Prior Publication Data
US 2023/0328841 A1 Oct. 12, 2023

Related U.S. Application Data

(60) Provisional application No. 63/068,926, filed on Aug. 21, 2020.

(51) Int. Cl.
*H04B 7/06* (2006.01)
*H04B 7/08* (2006.01)
(Continued)

(52) U.S. Cl.
CPC ....... *H04B 7/06966* (2023.05); *H04L 5/0051* (2013.01); *H04W 52/0229* (2013.01); *H04W 76/28* (2018.02)

(58) Field of Classification Search
CPC .............. H04W 76/28; H04W 52/0229; H04L 5/0051; H04L 5/0091; H04L 5/0023; H04B 7/06966; H04B 7/088; Y02D 30/70
(Continued)

(56) References Cited

U.S. PATENT DOCUMENTS

2018/0270689 A1 9/2018 Akkarakaran et al.
2019/0089579 A1* 3/2019 Sang .................. H04W 36/305
(Continued)

FOREIGN PATENT DOCUMENTS

CN 110402550 A 11/2019
CN 110536387 A 12/2019
(Continued)

OTHER PUBLICATIONS

PCT/IB2021/057687, "Notification of Transmittal of the International Search Report and the Written Opinion of the International Searching Authority, or the Declaration", International Searching Authority, Nov. 15, 2021, pp. 1-17.
(Continued)

*Primary Examiner* — Xuan Lu
(74) *Attorney, Agent, or Firm* — Kunzler Needham & Hilton

(57) ABSTRACT

Apparatuses, methods, and systems are disclosed for configuring a wakeup signal. One method includes receiving, at a user equipment, a discontinuous reception configuration including a slot offset, and/or an on-duration a periodicity. The method includes receiving a wakeup signal configuration including a wakeup signal offset and/or a monitoring occasion. The wakeup signal configuration is received using
(Continued)

scrambled downlink control information signaling. The method includes receiving information indicating to transmit a sounding reference signal during a discontinuous reception sleep period in a sounding reference signal resource using a transmit beam, and/or a transmit spatial filter. The method includes receiving a control signal using a corresponding receive beam and/or receive spatial filter. The method includes configuring a spatial filter relationship between the sounding reference signal resource and wakeup signal reception using downlink control information signal.

20 Claims, 7 Drawing Sheets

(51) Int. Cl.
*H04L 5/00* (2006.01)
*H04W 52/02* (2009.01)
*H04W 76/28* (2018.01)

(58) Field of Classification Search
USPC .......................................................... 370/330
See application file for complete search history.

(56) References Cited

U.S. PATENT DOCUMENTS

| | | | | |
|---|---|---|---|---|
| 2019/0097874 | A1* | 3/2019 | Zhou | H04W 16/28 |
| 2019/0174466 | A1* | 6/2019 | Zhang | H04L 5/0057 |
| 2019/0199412 | A1* | 6/2019 | Koskela | H04B 7/06952 |
| 2019/0297603 | A1 | 9/2019 | Guo et al. | |
| 2021/0267008 | A1* | 8/2021 | Dutta | H04W 76/28 |
| 2021/0274438 | A1 | 9/2021 | Guan | |
| 2021/0289443 | A1* | 9/2021 | Nam | H04W 52/0235 |
| 2021/0352758 | A1* | 11/2021 | Dutta | H04W 76/28 |
| 2021/0385766 | A1* | 12/2021 | Manolakos | H04W 52/0216 |
| 2022/0338118 | A1* | 10/2022 | Jang | H04B 7/0626 |

FOREIGN PATENT DOCUMENTS

| | | | |
|---|---|---|---|
| CN | 111294891 | A | 6/2020 |
| EP | 3863338 | A1 | 8/2021 |
| WO | 2020072975 | A1 | 4/2020 |
| WO | 2020114294 | A1 | 6/2020 |

OTHER PUBLICATIONS

Qualcomm Inc., "Triggering Adaptation of UE Power Consumption Characteristics", 3GPP TSG-RAN WG1 Meeting #94bis R1-1811283, Oct. 8-12, 2018, pp. 1-12.

Qualcomm Inc., "Potential Techniques for UE Power Saving", 3GPP TSG-RAN WG1 #96 R1-1903016, Feb. 25-Mar. 1, 2019, pp. 1-33.

3GPP, "3rd Generation Partnership Project; Technical Specification Group Radio Access Network; NR; Study on User Equipment (UE) power saving in NR (Release 16)", 3GPP TR 38.840 V16.0.0, Jun. 2019, pp. 1-74.

3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

* cited by examiner

CONFIGURING A WAKEUP SIGNAL

CROSS-REFERENCE TO RELATED APPLICATIONS

This application claims priority to U.S. Patent Application Ser. No. 63/068,926 entitled "APPARATUSES, METHODS, AND SYSTEMS FOR UE INITIATED DL BEAM ALIGNMENT DURING DRX SLEEP" and filed on Aug. 21, 2020 for Karthikeyan Ganesan, which is incorporated herein by reference in its entirety.

FIELD

The subject matter disclosed herein relates generally to wireless communications and more particularly relates to configuring a wakeup signal.

BACKGROUND

In certain wireless communications networks, a transmission beams may not be aligned. The misalignment of beams may result in poor communication.

BRIEF SUMMARY

Methods for configuring a wakeup signal are disclosed. Apparatuses and systems also perform the functions of the methods. One embodiment of a method includes receiving, at a user equipment, a discontinuous reception configuration including a slot offset, an on-duration a periodicity, or some combination thereof. In some embodiments, the method includes receiving a wakeup signal configuration including a wakeup signal offset, a monitoring occasion, or some combination thereof. The wakeup signal configuration is received using scrambled downlink control information signaling. In certain embodiments, the method includes receiving information indicating to transmit a sounding reference signal during a discontinuous reception sleep period in a sounding reference signal resource using a transmit beam, a transmit spatial filter, or a combination thereof. In various embodiments, the method includes receiving a control signal using a corresponding receive beam, receive spatial filter, or a combination thereof. In some embodiments, the method includes configuring a spatial filter relationship between the sounding reference signal resource and wakeup signal reception using downlink control information signal.

One apparatus for configuring a wakeup signal includes a user equipment. In some embodiments, the apparatus includes a receiver that: receives a discontinuous reception configuration including a slot offset, an on-duration a periodicity, or some combination thereof; receives a wakeup signal configuration including a wakeup signal offset, a monitoring occasion, or some combination thereof, wherein the wakeup signal configuration is received using scrambled downlink control information signaling; receives information indicating to transmit a sounding reference signal during a discontinuous reception sleep period in a sounding reference signal resource using a transmit beam, a transmit spatial filter, or a combination thereof; and receives a control signal using a corresponding receive beam, receive spatial filter, or a combination thereof. In various embodiments, the apparatus includes a processor that configures a spatial filter relationship between the sounding reference signal resource and wakeup signal reception using downlink control information signal.

Another embodiment of a method for configuring a wakeup signal includes transmitting, from a base station, a discontinuous reception configuration including a slot offset, an on-duration a periodicity, or some combination thereof. In some embodiments, the method includes transmitting a wakeup signal configuration including a wakeup signal offset, a monitoring occasion, or some combination thereof. The wakeup signal configuration is transmitted using scrambled downlink control information signaling. In certain embodiments, the method includes transmitting information indicating to a user equipment to transmit a sounding reference signal during a discontinuous reception sleep period in a sounding reference signal resource using a transmit beam, a transmit spatial filter, or a combination thereof. In various embodiments, the method includes transmitting a control signal using a corresponding receive beam, receive spatial filter, or a combination thereof.

Another apparatus for configuring a wakeup signal includes a base station. In some embodiments, the apparatus includes a transmitter that: transmits a discontinuous reception configuration including a slot offset, an on-duration a periodicity, or some combination thereof; transmits a wakeup signal configuration including a wakeup signal offset, a monitoring occasion, or some combination thereof, wherein the wakeup signal configuration is transmitted using scrambled downlink control information signaling; transmits information indicating to a user equipment to transmit a sounding reference signal during a discontinuous reception sleep period in a sounding reference signal resource using a transmit beam, a transmit spatial filter, or a combination thereof; and transmits a control signal using a corresponding receive beam, receive spatial filter, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
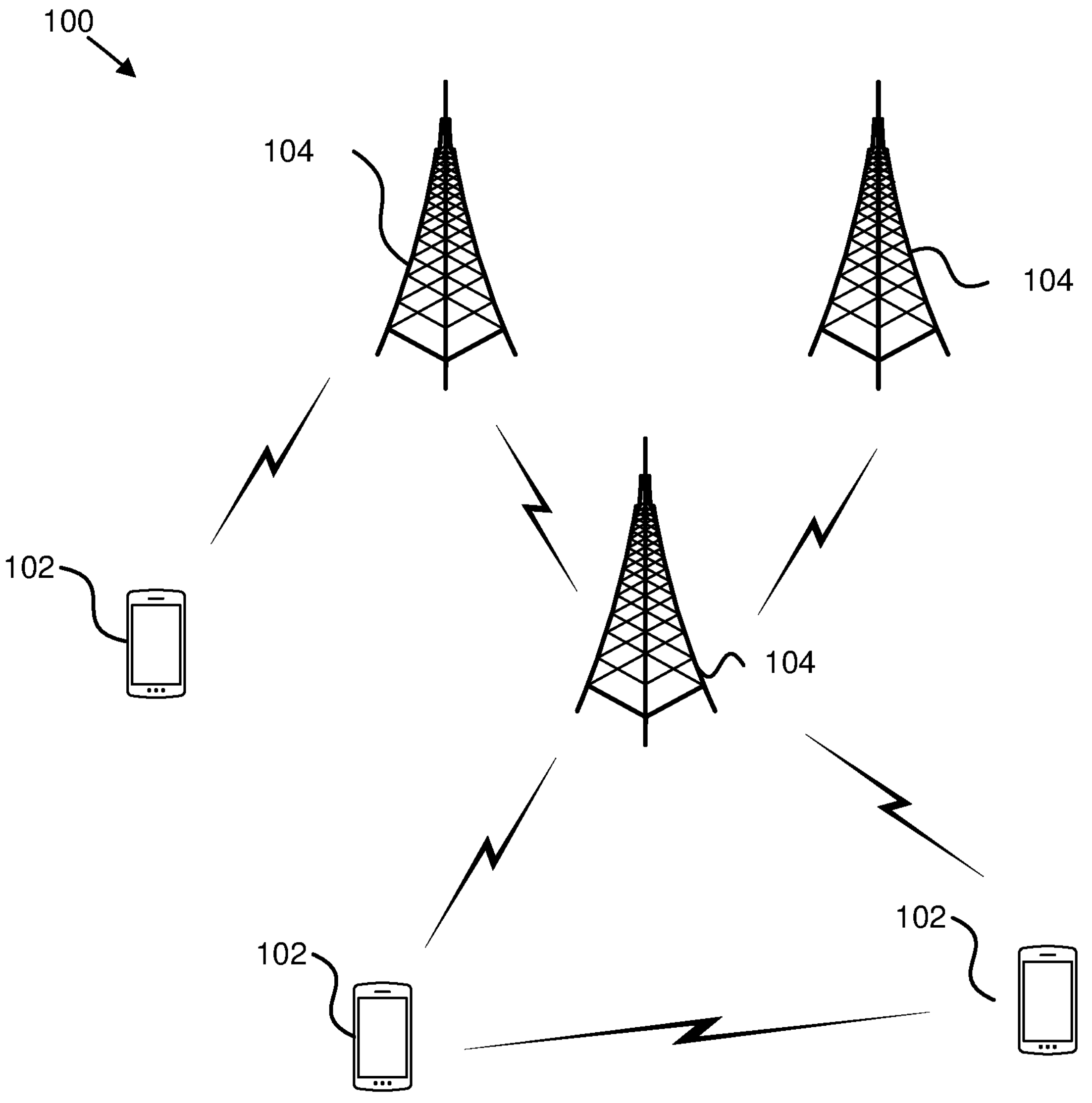
FIG. 1 is a schematic block diagram illustrating one embodiment of a wireless communication system for configuring a wakeup signal.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a wakeup signal. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment, a discontinuous reception configuration including a slot offset, an on-duration a periodicity, or some combination thereof. In some embodiments, the remote unit 102 may receive a wakeup signal configuration including a wakeup signal offset, a monitoring occasion, or some combination thereof. The wakeup signal configuration is received using scrambled downlink control information signaling. In certain embodiments, the remote unit 102 may receive information indicating to transmit a sounding reference signal during a discontinuous reception sleep period in a sounding reference signal resource using a transmit beam, a transmit spatial filter, or a combination thereof. In various embodiments, the remote unit 102 may receive a control signal using a corresponding receive beam, receive spatial filter, or a combination thereof. In some embodiments, the remote unit 102 may configure a spatial filter relationship between the sounding reference signal resource and wakeup signal reception using downlink control information signal. Accordingly, the remote unit 102 may be used for configuring a wakeup signal.

In certain embodiments, a network unit 104 may transmit, from a base station, a discontinuous reception configuration including a slot offset, an on-duration a periodicity, or some combination thereof. In some embodiments, the network unit 104 may transmit a wakeup signal configuration including a wakeup signal offset, a monitoring occasion, or some combination thereof. The wakeup signal configuration is transmitted using scrambled downlink control information signaling. In certain embodiments, the network unit 104 may transmit information indicating to a user equipment to transmit a sounding reference signal during a discontinuous reception sleep period in a sounding reference signal resource using a transmit beam, a transmit spatial filter, or a combination thereof. In various embodiments, the network unit 104 may transmit a control signal using a corresponding receive beam, receive spatial filter, or a combination thereof. Accordingly, the network unit 104 may be used for configuring a wakeup signal.

Figure 2:
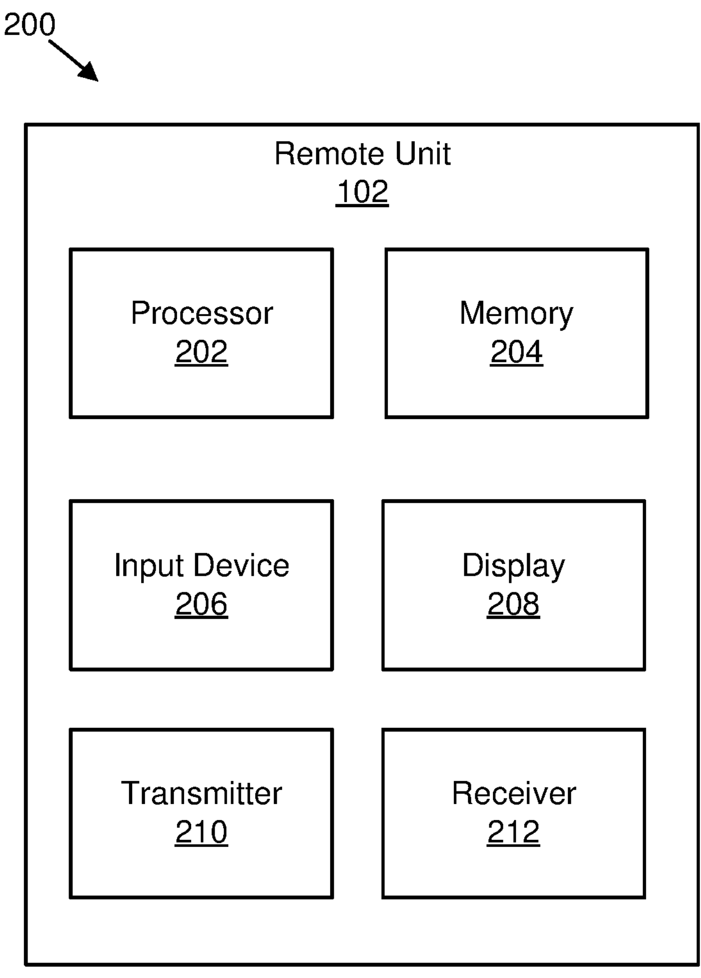
FIG. 2 is a schematic block diagram illustrating one embodiment of an apparatus that may be used for configuring a wakeup signal.

FIG. 2 depicts one embodiment of an apparatus 200 that may be used for configuring a wakeup signal. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives a discontinuous reception configuration including a slot offset, an on-duration a periodicity, or some combination thereof; receives a wakeup signal configuration including a wakeup signal offset, a monitoring occasion, or some combination thereof, wherein the wakeup signal configuration is received using scrambled downlink control information signaling; receives information indicating to transmit a sounding reference signal during a discontinuous reception sleep period in a sounding reference signal resource using a transmit beam, a transmit spatial filter, or a combination thereof; and receives a control signal using a corresponding receive beam, receive spatial filter, or a combination thereof. In various embodiments, the processor 202 configures a spatial filter relationship between the sounding reference signal resource and wakeup signal reception using downlink control information signal.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
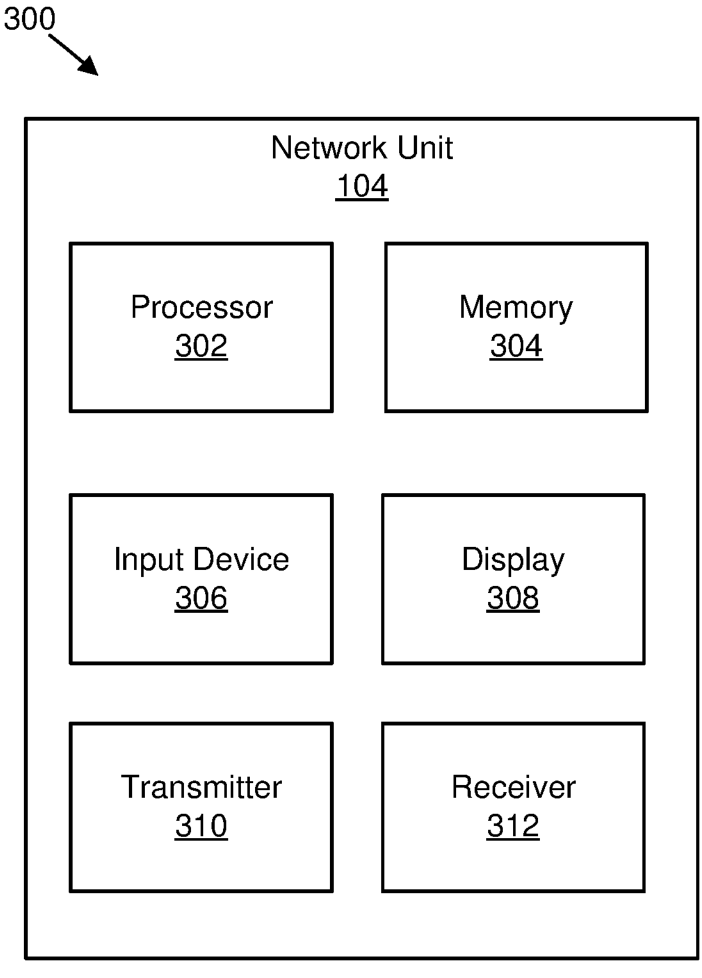
FIG. 3 is a schematic block diagram illustrating one embodiment of an apparatus that may be used for configuring a wakeup signal.

FIG. 3 depicts one embodiment of an apparatus 300 that may be used for configuring a wakeup signal. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a discontinuous reception configuration including a slot offset, an on-duration a periodicity, or some combination thereof; transmits a wakeup signal configuration including a wakeup signal offset, a monitoring occasion, or some combination thereof, wherein the wakeup signal configuration is transmitted using scrambled downlink control information signaling; transmits information indicating to a user equipment to transmit a sounding reference signal during a discontinuous reception sleep period in a sounding reference signal resource using a transmit beam, a transmit spatial filter, or a combination thereof; and transmits a control signal using a corresponding receive beam, receive spatial filter, or a combination thereof.

In various embodiments, such as for mmWave frequencies above 6 GHz and above 52.6 GHz, a downlink ("DL") beam alignment and recovery procedure may be based on a channel state information ("CSI") reference signal ("RS") ("CSI-RS"), physical random access channel ("PRACH"), synchronization signal block ("SSB"), and/or physical uplink control channel ("PUCCH") scheduling resource ("SR") ("PUCCH-SR") based beam recovery. Such embodiments may rely on beam feedback during a discontinuous reception ("DRX") on-duration time.

In certain embodiments, there may be beam misalignment during DRX sleep of a user equipment ("UE") which results in the UE being unable to receive a wake up signal (e.g., downlink control information ("DCI") wake up signal ("WUS") ("DCI_WUS")) in a configured downlink ("DL") beam. In such embodiments, a control resource set ("CORESET") and search space for transmitting DCI_WUS may be shared with other DCI formats and a DL beam for a physical downlink control channel ("PDCCH") transmission may be associated with a CORESET. A CSI report may only be transmitted during a next DRX on-duration time period which results in a UE entering an on-duration periodically for beam correction purposes.

In some embodiments, such as for higher frequencies such as beyond 52.6 GHz, beam misalignment may happen very frequently due to a high pathloss, a narrower beam width, and/or beam-blockage. In such embodiments, the UE may miss a DCI_WUS resulting in unnecessary waking up the UE only for beam correction while there is no DL data for transmission in a next DRX on-duration time period.

In various embodiments, a UE initiated beam alignment procedure and channel measurements during a DRX sleep period using a sounding reference signal ("SRS") transmission may be used to result in mapping between a beam and/or spatial filter of an SRS resource to a beam and/or spatial filter used for DCI_WUS reception. In such embodiments, a plurality of CORESETs, search spaces, and/or monitoring occasions may be defined for a UE. Moreover, each of the CORESETs, search spaces, and/or monitoring occasions may be assigned a certain beam and/or spatial filter for DCI_WUS reception.

In a first embodiment, there may be SRS based beam alignment for DCI_WUS reception. In the first embodiment, a gNB may configure a UE with one or more SRS resource sets for DL beam alignment (e.g., and for uplink ("UL") beam alignment) during a DRX sleep period (e.g., DRX off period). In such an embodiment, each SRS resource is associated with a UE TX beam and/or spatial filter (e.g., by configuring a transmission configuration indicator ("TCI") state or spatial relation information for a target SRS indicating a spatial setting between the target SRS transmission and a reference RS such as an SSB or CSI-RS (e.g., CSI-RS for beam management)). Accordingly, the UE may transmit SRS using one or more UE TX beams and/or spatial filters during the DRX sleep period and a UE that supports beam correspondence may receive a DCI_WUS using the same beam and/or spatial filter that was used for the transmission of SRS.

In the first embodiment, the gNB may configure a UE with a mapping between each of the SRS resources assigned to a TX beam and/or spatial filter to that of a DCI_WUS reception using a plurality of CORESETs, search spaces, and/or monitoring occasions, where each of them is assigned, configured, and/or associated with a beam and/or spatial filter for reception. In one example, the DCI_WUS is transmitted with a narrower beam width than a spatial relation reference signal ("RS") (e.g., synchronization signal ("SS") and/or physical broadcast channel ("PBCH") ("SS/PBCH") block) for an SRS resource. In another example, a tracking reference signal ("TRS") may be transmitted before the DCI_WUS and the DCI_WUS uses the same beam as the TRS (e.g., TCI-state for DCI_WUS includes TRS as a source RS with QCL_TypeD (and possibly additionally QCL_TypeA relationship)).

In some embodiments, a gNB may configure for a UE one of the following options with a certain beam and/or spatial filter (e.g., TCI-state with QCL-TypeD source reference signal) for DCI_WUS reception: 1) a plurality of CORESETs may be configured for a UE if each of the CORESETs is assigned, configured, and/or associated with a certain beam and/or spatial filter for DCI_WUS reception; 2) a plurality of search spaces may be configured for a UE if each of the search spaces is assigned and/or associated with a certain beam and/or spatial filter for DCI_WUS reception; and 3) a plurality of DCI_WUS monitoring occasions may be configured for a UE if each of the monitoring occasions is assigned and/or associated with a certain beam and/or spatial filter for DCI_WUS reception.

In one implementation of the first embodiment, DCI with cyclic redundancy check ("CRC") scrambled by a power saving ("PS") radio network temporary identifier ("RNTI") ("PS-RNTI") ("DCP") or a power saving configuration may contain one or more SRS resource sets to be used by a UE during a DRX sleep period for the purpose of beam alignment with limited SRS resource set configuration. In one example, an SRS resource set is limited to single SRS port and may support one SRS symbol, fewer resource blocks ("RBs"), a comb-4 pattern, or a comb-2 pattern.

In various embodiments, a DCP configuration of a UE may contain details about one or more SRS resource mapped to a UE TX beam and/or spatial filter (e.g., TCI-state or spatial relation information) and contains details on the beam and/or spatial filter (e.g., TCI-state) for DCI_WUS reception using one or more CORESETs, search spaces, and/or monitoring occasions assigned to a UE.

Figure 4:
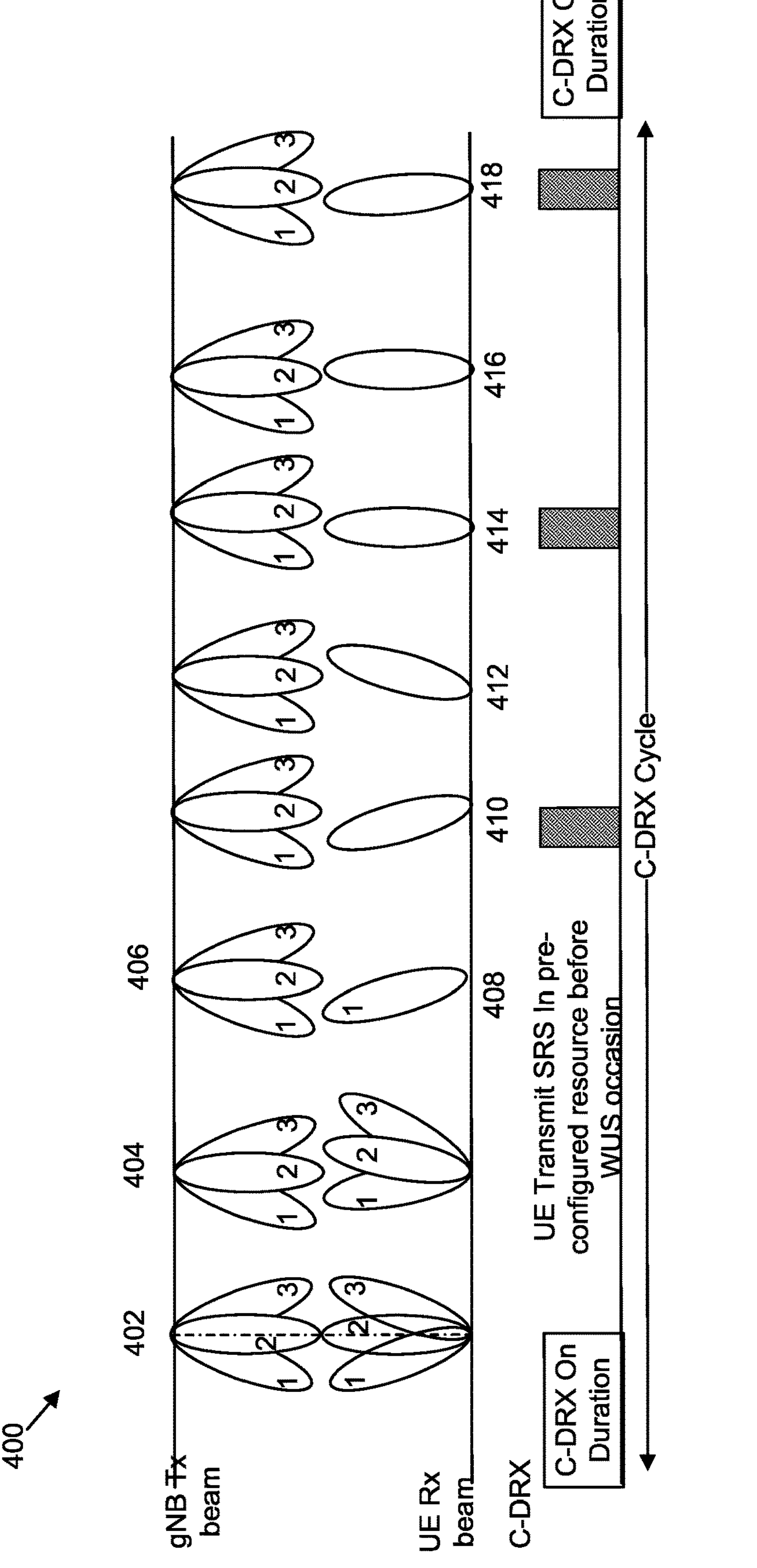
FIG. 4 is a schematic block diagram illustrating one embodiment of communications for beam alignment.

FIG. 4 is a schematic block diagram 400 illustrating one embodiment of communications for beam alignment using a mapping between SRS and DCI_WUS during DRX sleep. Transmissions and/or receptions are illustrated for a gNB TX beam (e.g., transmission and receptions are illustrated) and a UE RX beam (e.g., transmission and receptions are illustrated) over a connected DRX ("C-DRX") cycle. The C-DRX cycle includes C-DRX on durations, and time between the C-DRX on durations (e.g., DRX sleep). At a time 402, N best beam pairs are determined. Moreover, at a time 404, there is a beam misalignment during the C-DRX off period (e.g., DRX sleep). The UE transmits SRSs in pre-configured resources before WUS occasions (e.g., illustrated at times 410, 414, and 418 along the C-DRX cycle). Specifically, at a time 408, the UE transmits an SRS transmission (e.g., TCI state #1), and at a time 406 the gNB receives the SRS transmission. The gNB transmits CSI-RS in a beam which it receives SRS and there is a mapping between SRS and CSI-RS. At the time 410, the UE receives CSI-RS using TCI state #1. Moreover, at a time 412, the UE transmits an SRS transmission (e.g., TCI state #2), and at the time 414 the UE receives CSI-RS using TCI state #2. Further, at a time 416, the UE transmits an SRS transmission (e.g., TCI state #3), and at the time 418 the UE receives CSI-RS using TCI state #3.

Figure 5:
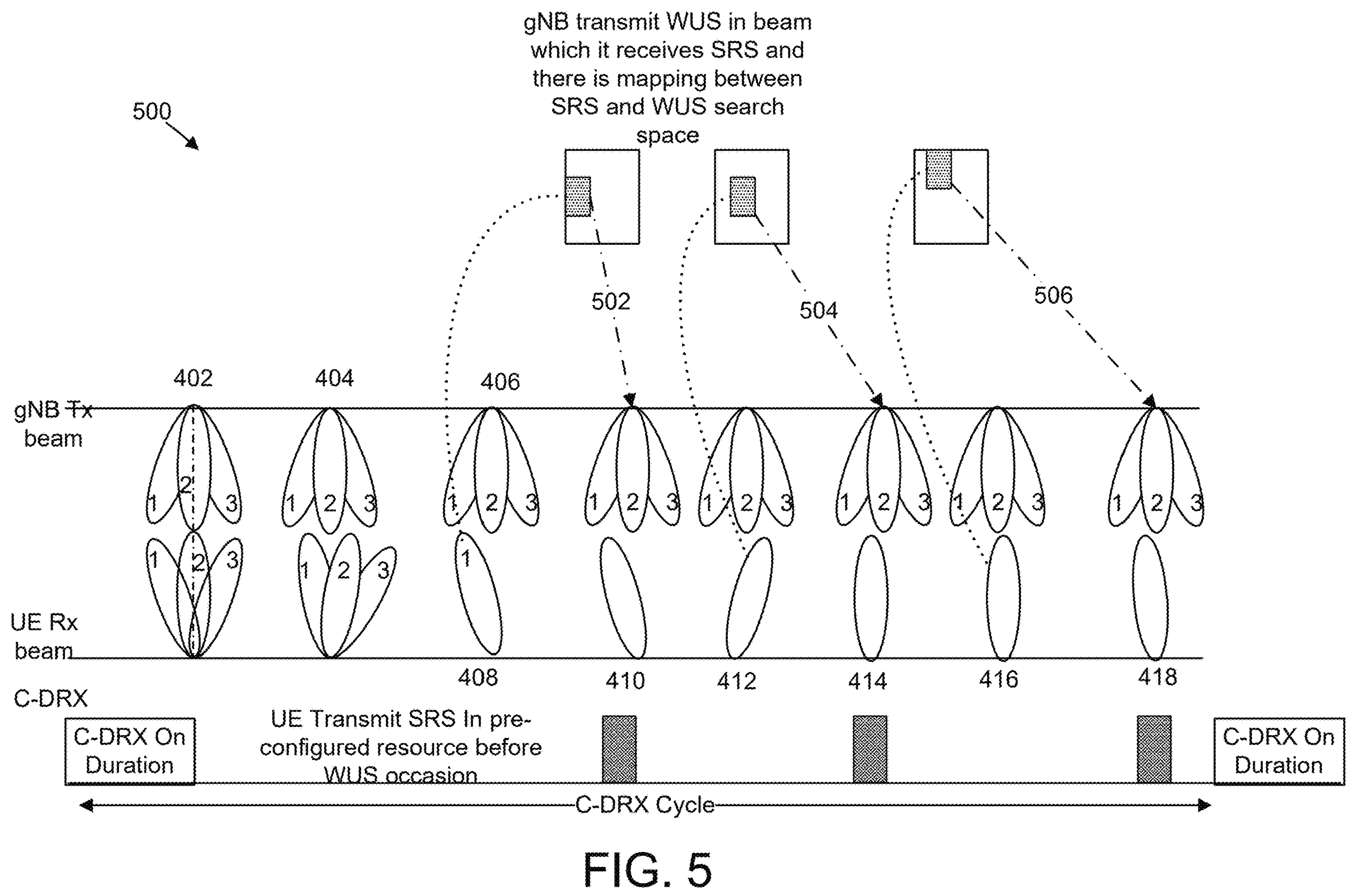
FIG. 5 is a schematic block diagram illustrating another embodiment of communications for beam alignment.

FIG. 5 is a schematic block diagram 500 illustrating another embodiment of communications for beam alignment using a mapping between SRS and DCI_WUS during DRX sleep. Transmissions and/or receptions are illustrated for a gNB TX beam (e.g., transmission and receptions are illustrated) and a UE RX beam (e.g., transmission and receptions are illustrated) over a connected DRX ("C-DRX") cycle. The C-DRX cycle includes C-DRX on durations, and time between the C-DRX on durations (e.g., DRX sleep). At a time 402, N best beam pairs are determined. Moreover, at a time 404, there is a beam misalignment during the C-DRX off period (e.g., DRX sleep). The UE transmits SRSs in pre-configured resources before WUS occasions (e.g., illustrated at times 410, 414, and 418 along the C-DRX cycle). Specifically, at a time 408, the UE transmits an SRS transmission (e.g., TCI state #1), and at a time 406 the gNB receives the SRS transmission. The gNB transmits CSI-RS in a beam which it receives SRS and there is a mapping between SRS and CSI-RS. At the time 410, the UE receives CSI-RS using TCI state #1. Moreover, at a time 412, the UE transmits an SRS transmission (e.g., TCI state #2), and at the time 414 the UE receives CSI-RS using TCI state #2. Further, at a time 416, the UE transmits an SRS transmission (e.g., TCI state #3), and at the time 418 the UE receives CSI-RS using TCI state #3. The gNB transmits a WUS in the beam in which it receives SRS and there is a mapping between SRS and a WUS search space (e.g., search space TCI state #1 502, search space TCI state #2 504, search space TCI state #3 506).

As shown in FIG. 5, a UE may transmit SRS resource #1 using UE Tx beam #1 and, if beam correspondence is supported by a transmission and reception point ("TRP") and/or gNB, then the UE expects to receive a DCI_WUS in the configured CORESET, search space, and/or monitoring occasion using the same receive beam (e.g., RX beam #1) where it transmitted the SRS using resource #1. If the UE does not receive any DCI_WUS response, then the UE transmit SRS resource #2 using UE TX beam #2 and, if beam correspondence is supported, the UE expects to receive DCI_WUS in the same receive beam (e.g., RX beam #2), and so forth.

In another implementation of the first embodiment, during a DRX sleep period, a UE may transmit a first SRS beam (e.g., or another DL signal and/or channel such as CSI-RS for beam management) using the same beam and/or spatial filter that was previously used to receive a latest PDCCH in a previous DRX on-duration time period. In one example, the UE selects the SRS resource with the spatial relation RS that is same as the QCL-TypeD source RS for receiving the latest PDCCH (e.g., TCI state of PDCCH) and/or DL channel or the RS corresponding to the other DL signal. If a corresponding SRS beam is not received by a gNB or if the measurements are below a threshold, then the gNB may not transmit a DCI_WUS on the corresponding beam. If the UE doesn't receive the corresponding DCI_WUS, then the UE may start beam sweeping with SRSs on other beams (e.g., transmit SRS using another beam, such as a beam that was recently received (e.g., in the previous DRX on-duration time period) with a measurement (e.g., reference signal received power ("RSRP")) above a threshold). In certain examples, if the UE has received a PDCCH transmission based on a beam used to receive CSI-RS in a previous DRX on-duration time period, then the UE supporting beam correspondence may start SRS transmissions using the same TX beam and/or spatial filter that is used to receive the CSI-RS.

In a further implementation of the first embodiment, during the DRX sleep period, a UE may start monitoring for DCI_WUS reception using the same RX beam and/or spatial filter that was previously used to receive a PDCCH transmission in a previous DRX on-duration time period. If a UE does not receive any DCI_WUS within certain configured monitoring occasions (e.g., configured slots and/or symbol offset) (e.g., or RSRP of the beam (e.g., QCL-TypeD source reference signal of the TCI state associated to the DCI_WUS) configured to receive DCI_WUS falls below a configured threshold, which may happen due to beam misalignment during the DRX sleep period), then the UE may start an SRS transmission using a plurality of TX beams and/or spatial filters and expect to receive a DCI_WUS in a corresponding RX beam and/or spatial filter. In some embodiments, a DCP configuration contains details about configured slots and/or symbol offsets where a UE may wait to receive DCI_WUS before starting to transmit SRS. In one example, a symbol offset may be a defined as a number of DCI_WUS monitoring occasions where the UE may wait to receive DCI_WUS before starting to transmit SRS.

In another implementation of the first embodiment, during the DRX sleep period, a UE may start SRS transmission using a plurality of TX beams and/or spatial filters before a monitoring occasion of a DCI_WUS and a gNB may start transmitting the DCI_WUS using one of the beams and/or spatial filters in which it successfully receives an SRS transmission.

In certain implementations of the first embodiment, during the DRX sleep period, a UE supporting multi beam operation may start transmitting SRS using a plurality of beam and/or spatial filters before a monitoring occasion of a DCI_WUS and a gNB may start transmitting DCI_WUS using one of the beams and/or spatial filters in which it successfully receives an SRS transmission.

In some embodiments, an SRS resource is semi-persistently configured (e.g., semi-persistent SRS resource configuration) as part of a DCP configuration and the SRS resource may remain activate only during DRX sleep and implicitly deactivated during a DRX on-duration period.

In various embodiments, an SRS resource is semi-persistently configured as part of DCP configuration and the SRS resource is activated to be used in a DRX sleep period using a MAC CE in a previous DRX on-duration period.

In certain embodiments, a gNB may update a beam and/or spatial filter used for transmission of PDCCH in a next DRX on-duration period based on one or more SRS procedures during DRX. In such embodiments, a UE may receive a first PDCCH transmission in a next occurrence of the DRX on-duration period using the same beam and/or spatial filter that was used for the reception of DCI_WUS.

In a second embodiment, there may be SRS-CSI-RS based beam alignment in DRX sleep with no DCI_WUS configured. According to the second embodiment, there may be a beam alignment for a PCell if a UE is not configured to monitor DCI_WUS during a DRX sleep period.

In the second embodiment, a gNB may configure (e.g., for a UE) one or more SRS resource sets for DL beam alignment in the PCell during a DRX sleep period. In such an embodiment, each SRS resource is associated with a UE TX beam and/or spatial filter. Accordingly, the UE may transmit SRSs using one or more UE TX beam and/or spatial filters during the DRX sleep period and a UE supporting beam correspondence may receive CSI-RS using the same RX beam and/or spatial filter. The gNB could configure a UE with a one to one mapping between each SRS resource assigned to a TX beam and/or spatial filter to that of a CSI-RS reception assigned to a beam and/or spatial filter.

In one implementation of the second embodiment, an SRS resource and a CSI-RS resource may be semi-persistently configured as part of a DCP configuration and these SRS resources and CSI-RS resources may remain activate only during DRX sleep. In another implementation of the second embodiment, SRS resources and CSI-RS resources are semi-persistently configured as part of a DCP configuration and the SRS resources and CSI-RS resources may be activated using a MAC CE in a previous DRX on-duration period.

It should be noted that one or more embodiments described for configuring an SRS resource set and an SRS transmission including a beam and/or spatial filter in the first embodiment may be equally applicable to the second embodiment.

It should also be noted that one or more embodiments described for configuring DCI_WUS including a beam and/or spatial filter relationship in the first embodiment may be equally applicable to receiving CSI-RS (e.g., instead of DCI_WUS) in the second embodiment.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")0, or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In various embodiments, a transmission configuration indicator ("TCI") state associated with a target transmission may indicate a quasi-collocation relationship between a target transmission (e.g., target RS of demodulation reference signal ("DM-RS") ports of the target transmission during a transmission occasion) and source reference signals (e.g., synchronization signal block ("SSB"), channel state information reference signal ("CSI-RS"), and/or sounding reference signal ("SRS")) with respect to quasi co-location type parameters indicated in a corresponding TCI state. A device may receive a configuration of multiple transmission configuration indicator states for a serving cell for transmissions on the serving cell.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 6:
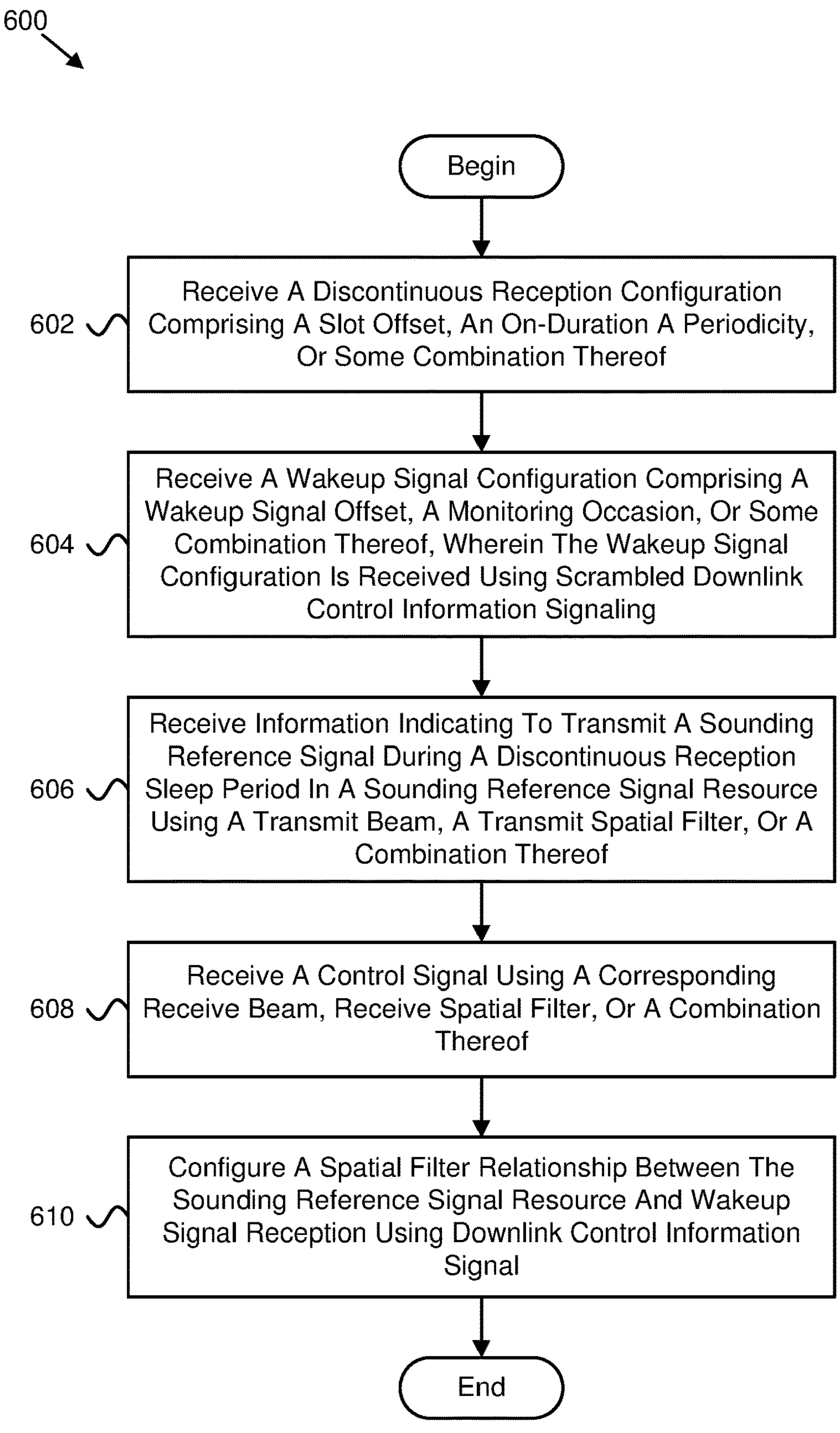
FIG. 6 is a flow chart diagram illustrating one embodiment of a method for configuring a wakeup signal.

FIG. 6 is a flow chart diagram illustrating one embodiment of a method 600 for configuring a wakeup signal. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602 a discontinuous reception configuration including a slot offset, an on-duration a periodicity, or some combination thereof. In some embodiments, the method 600 includes receiving 604 a wakeup signal configuration including a wakeup signal offset, a monitoring occasion, or some combination thereof. The wakeup signal configuration is received using scrambled downlink control information signaling. In certain embodiments, the method 600 includes receiving 606 information indicating to transmit a sounding reference signal during a discontinuous reception sleep period in a sounding reference signal resource using a transmit beam, a transmit spatial filter, or a combination thereof. In various embodiments, the method 600 includes receiving 608 a control signal using a corresponding receive beam, receive spatial filter, or a combination thereof. In some embodiments, the method 600 includes configuring 610 a spatial filter relationship between the sounding reference signal resource and wakeup signal reception using downlink control information signal.

In certain embodiments, the control signal is received using a plurality of control resource sets, and each control resource set of the plurality of control resources sets is assigned to a beam, a spatial filter, or a combination thereof corresponding to the sounding reference signal. In some embodiments, the control signal is received using a plurality of search spaces, and each search space of the plurality of search spaces is assigned to a beam, a spatial filter, or a combination thereof corresponding to the sounding reference signal. In various embodiments, the control signal is received using a plurality of monitoring occasions, and each monitoring occasion of the plurality of monitoring occasions is assigned to a beam, a spatial filter, or a combination thereof corresponding to the sounding reference signal.

In one embodiment, the method 600 further comprises activating a semi-persistent sounding reference signal resource during the discontinuous reception sleep period implicitly, and deactivation the semi-persistent sounding reference signal resource during a discontinuous reception on-period. In certain embodiments, the method 600 further comprises activating a semi-persistent sounding reference signal resource during the discontinuous reception sleep period using a medium access control control element in a previous discontinuous reception on-duration period. In some embodiments, the method 600 further comprises starting sounding reference signal beam sweeping based on a beam, a spatial filter, or a combination thereof previously used to receive a physical downlink control channel transmission in a previous discontinuous reception on-period.

In various embodiments, a measurement corresponding to the beam, the spatial filter, or the combination thereof is above a predetermined threshold. In one embodiment, the method 600 further comprises, in response to failing to decode the control signal using a configured beam in at least one monitoring occasion, implicitly triggering sounding reference signal transmission for beam alignment.

In certain embodiments, the method 600 further comprises receiving a first physical downlink control channel in a next occurrence of a discontinuous reception on-period using a beam, a spatial filter, or a combination thereof used for receiving the control signal. In some embodiments, the control signal comprises a downlink control information wakeup signal.

Figure 7:
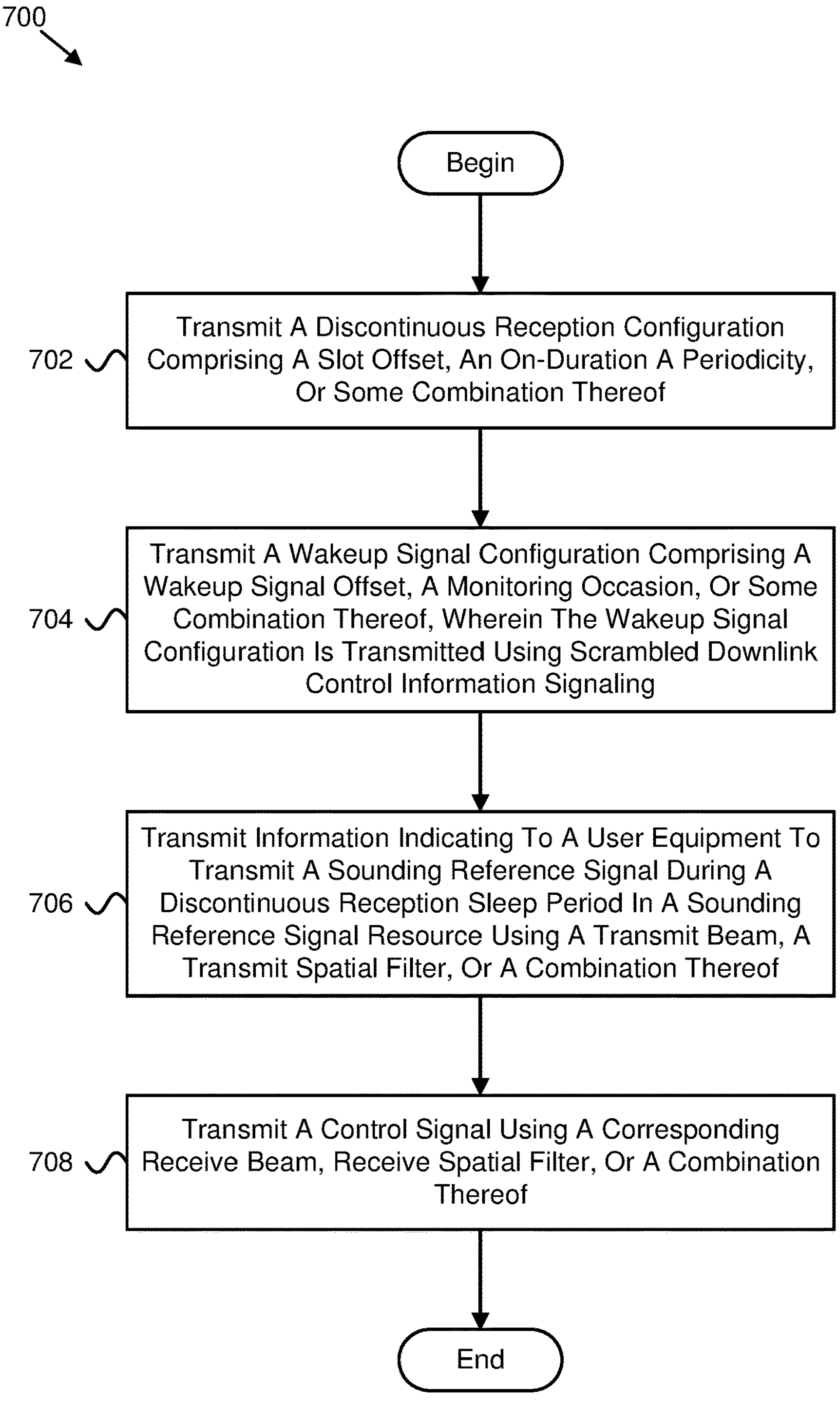
FIG. 7 is a flow chart diagram illustrating another embodiment of a method for configuring a wakeup signal.

FIG. 7 is a flow chart diagram illustrating one embodiment of a method 700 for configuring a wakeup signal. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702 a discontinuous reception configuration including a slot offset, an on-duration a periodicity, or some combination thereof. In some embodiments, the method 700 includes transmitting 704 a wakeup signal configuration including a wakeup signal offset, a monitoring occasion, or some combination thereof. The wakeup signal configuration is transmitted using scrambled downlink control information signaling. In certain embodiments, the method 700 includes transmitting 706 information indicating to a user equipment to transmit a sounding reference signal during a discontinuous reception sleep period in a sounding reference signal resource using a transmit beam, a transmit spatial filter, or a combination thereof. In various embodiments, the method 700 includes transmitting 708 a control signal using a corresponding receive beam, receive spatial filter, or a combination thereof.

In certain embodiments, the control signal is transmitted using a plurality of control resource sets, and each control resource set of the plurality of control resources sets is assigned to a beam, a spatial filter, or a combination thereof corresponding to the sounding reference signal. In some embodiments, the control signal is transmitted using a plurality of search spaces, and each search space of the plurality of search spaces is assigned to a beam, a spatial filter, or a combination thereof corresponding to the sounding reference signal.

In various embodiments, the control signal is transmitted using a plurality of monitoring occasions, and each monitoring occasion of the plurality of monitoring occasions is assigned to a beam, a spatial filter, or a combination thereof corresponding to the sounding reference signal. In one embodiment, the method 700 further comprises transmitting a first physical downlink control channel in a next occurrence of a discontinuous reception on-period using a beam, a spatial filter, or a combination thereof used for receiving the control signal. In certain embodiments, the control signal comprises a downlink control information wakeup signal.

In one embodiment, a method of a user equipment comprises: receiving a discontinuous reception configuration comprising a slot offset, an on-duration a periodicity, or some combination thereof; receiving a wakeup signal configuration comprising a wakeup signal offset, a monitoring occasion, or some combination thereof, wherein the wakeup signal configuration is received using scrambled downlink control information signaling; receiving information indicating to transmit a sounding reference signal during a discontinuous reception sleep period in a sounding reference signal resource using a transmit beam, a transmit spatial filter, or a combination thereof; receiving a control signal using a corresponding receive beam, receive spatial filter, or a combination thereof; and configuring a spatial filter relationship between the sounding reference signal resource and wakeup signal reception using downlink control information signal.

In certain embodiments, the control signal is received using a plurality of control resource sets, and each control resource set of the plurality of control resources sets is assigned to a beam, a spatial filter, or a combination thereof corresponding to the sounding reference signal.

In some embodiments, the control signal is received using a plurality of search spaces, and each search space of the plurality of search spaces is assigned to a beam, a spatial filter, or a combination thereof corresponding to the sounding reference signal.

In various embodiments, the control signal is received using a plurality of monitoring occasions, and each monitoring occasion of the plurality of monitoring occasions is assigned to a beam, a spatial filter, or a combination thereof corresponding to the sounding reference signal.

In one embodiment, the method further comprises activating a semi-persistent sounding reference signal resource during the discontinuous reception sleep period implicitly, and deactivation the semi-persistent sounding reference signal resource during a discontinuous reception on-period.

In certain embodiments, the method further comprises activating a semi-persistent sounding reference signal resource during the discontinuous reception sleep period using a medium access control control element in a previous discontinuous reception on-duration period.

In some embodiments, the method further comprises starting sounding reference signal beam sweeping based on a beam, a spatial filter, or a combination thereof previously used to receive a physical downlink control channel transmission in a previous discontinuous reception on-period.

In various embodiments, a measurement corresponding to the beam, the spatial filter, or the combination thereof is above a predetermined threshold.

In one embodiment, the method further comprises, in response to failing to decode the control signal using a configured beam in at least one monitoring occasion, implicitly triggering sounding reference signal transmission for beam alignment.

In certain embodiments, the method further comprises receiving a first physical downlink control channel in a next occurrence of a discontinuous reception on-period using a beam, a spatial filter, or a combination thereof used for receiving the control signal.

In some embodiments, the control signal comprises a downlink control information wakeup signal.

In one embodiment, an apparatus comprises a user equipment. The apparatus further comprises: a receiver that: receives a discontinuous reception configuration comprising a slot offset, an on-duration a periodicity, or some combination thereof; receives a wakeup signal configuration comprising a wakeup signal offset, a monitoring occasion, or some combination thereof, wherein the wakeup signal configuration is received using scrambled downlink control information signaling; receives information indicating to transmit a sounding reference signal during a discontinuous reception sleep period in a sounding reference signal resource using a transmit beam, a transmit spatial filter, or a combination thereof; and receives a control signal using a corresponding receive beam, receive spatial filter, or a combination thereof; and a processor that configures a spatial filter relationship between the sounding reference signal resource and wakeup signal reception using downlink control information signal.

In certain embodiments, the control signal is received using a plurality of control resource sets, and each control resource set of the plurality of control resources sets is assigned to a beam, a spatial filter, or a combination thereof corresponding to the sounding reference signal.

In some embodiments, the control signal is received using a plurality of search spaces, and each search space of the plurality of search spaces is assigned to a beam, a spatial filter, or a combination thereof corresponding to the sounding reference signal.

In various embodiments, the control signal is received using a plurality of monitoring occasions, and each monitoring occasion of the plurality of monitoring occasions is assigned to a beam, a spatial filter, or a combination thereof corresponding to the sounding reference signal.

In one embodiment, the processor activates a semi-persistent sounding reference signal resource during the discontinuous reception sleep period implicitly, and deactivation the semi-persistent sounding reference signal resource during a discontinuous reception on-period.

In certain embodiments, the processor activates a semi-persistent sounding reference signal resource during the discontinuous reception sleep period using a medium access control control element in a previous discontinuous reception on-duration period.

In some embodiments, the processor starts sounding reference signal beam sweeping based on a beam, a spatial filter, or a combination thereof previously used to receive a physical downlink control channel transmission in a previous discontinuous reception on-period.

In various embodiments, a measurement corresponding to the beam, the spatial filter, or the combination thereof is above a predetermined threshold.

In one embodiment, the processor, in response to failing to decode the control signal using a configured beam in at least one monitoring occasion, implicitly triggers sounding reference signal transmission for beam alignment.

In certain embodiments, the receiver receives a first physical downlink control channel in a next occurrence of a discontinuous reception on-period using a beam, a spatial filter, or a combination thereof used for receiving the control signal.

In some embodiments, the control signal comprises a downlink control information wakeup signal.

In one embodiment, a method of a base station comprises: transmitting a discontinuous reception configuration comprising a slot offset, an on-duration a periodicity, or some combination thereof; transmitting a wakeup signal configuration comprising a wakeup signal offset, a monitoring occasion, or some combination thereof, wherein the wakeup signal configuration is transmitted using scrambled downlink control information signaling; transmitting information indicating to a user equipment to transmit a sounding reference signal during a discontinuous reception sleep period in a sounding reference signal resource using a transmit beam, a transmit spatial filter, or a combination thereof; and transmitting a control signal using a corresponding receive beam, receive spatial filter, or a combination thereof.

In certain embodiments, the control signal is transmitted using a plurality of control resource sets, and each control resource set of the plurality of control resources sets is assigned to a beam, a spatial filter, or a combination thereof corresponding to the sounding reference signal.

In some embodiments, the control signal is transmitted using a plurality of search spaces, and each search space of the plurality of search spaces is assigned to a beam, a spatial filter, or a combination thereof corresponding to the sounding reference signal.

In various embodiments, the control signal is transmitted using a plurality of monitoring occasions, and each monitoring occasion of the plurality of monitoring occasions is assigned to a beam, a spatial filter, or a combination thereof corresponding to the sounding reference signal.

In one embodiment, the method further comprises transmitting a first physical downlink control channel in a next occurrence of a discontinuous reception on-period using a beam, a spatial filter, or a combination thereof used for receiving the control signal.

In certain embodiments, the control signal comprises a downlink control information wakeup signal.

In one embodiment, an apparatus comprises a base station. The apparatus further comprises: a transmitter that: transmits a discontinuous reception configuration comprising a slot offset, an on-duration a periodicity, or some combination thereof transmits a wakeup signal configuration comprising a wakeup signal offset, a monitoring occasion, or some combination thereof, wherein the wakeup signal configuration is transmitted using scrambled downlink control information signaling; transmits information indicating to a user equipment to transmit a sounding reference signal during a discontinuous reception sleep period in a sounding reference signal resource using a transmit beam, a transmit spatial filter, or a combination thereof; and transmits a control signal using a corresponding receive beam, receive spatial filter, or a combination thereof.

In certain embodiments, the control signal is transmitted using a plurality of control resource sets, and each control resource set of the plurality of control resources sets is assigned to a beam, a spatial filter, or a combination thereof corresponding to the sounding reference signal.

In some embodiments, the control signal is transmitted using a plurality of search spaces, and each search space of the plurality of search spaces is assigned to a beam, a spatial filter, or a combination thereof corresponding to the sounding reference signal.

In various embodiments, the control signal is transmitted using a plurality of monitoring occasions, and each monitoring occasion of the plurality of monitoring occasions is assigned to a beam, a spatial filter, or a combination thereof corresponding to the sounding reference signal.

In one embodiment, the transmitter transmits a first physical downlink control channel in a next occurrence of a discontinuous reception on-period using a beam, a spatial filter, or a combination thereof used for receiving the control signal.

In certain embodiments, the control signal comprises a downlink control information wakeup signal.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving a discontinuous reception (DRX) configuration comprising a slot offset, an on-duration, and a periodicity;

receiving a wakeup signal configuration comprising a wakeup signal offset, or a monitoring occasion, or both, wherein the wakeup signal configuration is received using scrambled downlink control information (DCI) signaling;

receiving information indicating to transmit a sounding reference signal (SRS) during a DRX sleep period in a SRS resource using a transmit beam, or a transmit spatial filter, or both, wherein transmitting the SRS during the DRX sleep period enables beam alignment for wakeup signal reception prior to a next DRX on-duration;

receiving a control signal using a corresponding receive beam, or a receive spatial filter, or both; and receiving, via scrambled DCI associated with the wakeup signal, an indication that configures a spatial filter relationship between the SRS resource used during the DRX sleep period and the receive beam or receive spatial filter used for wakeup signal monitoring.

2. The method of claim 1, wherein the control signal is received using a plurality of control resource sets, and each control resource set of the plurality of control resource sets is assigned to a beam, or a spatial filter, or both corresponding to the SRS.

3. The method of claim 1, wherein the control signal is received using a plurality of search spaces, and each search space of the plurality of search spaces is assigned to a beam, or a spatial filter, or both corresponding to the SRS.

4. The method of claim 1, wherein the control signal is received using a plurality of monitoring occasions, and each monitoring occasion of the plurality of monitoring occasions is assigned to a beam, or a spatial filter, or both corresponding to the SRS.

5. The method of claim 1, further comprising activating a semi-persistent SRS resource during the DRX sleep period implicitly, and deactivation the semi-persistent SRS resource during a DRX on-period.

6. The method of claim 1, further comprising activating a semi-persistent SRS resource during the DRX sleep period using a medium access control (MAC) control element (CE) in a previous DRX on-duration period.

7. A user equipment (UE), comprising:

at least one memory; and at least one processor coupled with the at least one memory and configured to cause the UE to:

receive a discontinuous reception (DRX) configuration comprising a slot offset, an on-duration, and a periodicity;

receive a wakeup signal configuration comprising a wakeup signal offset, or a monitoring occasion, or both, wherein the wakeup signal configuration is received using scrambled downlink control information (DCI) signaling;

receive information indicating to transmit a sounding reference signal (SRS) during a DRX sleep period in a SRS resource using a transmit beam, or a transmit spatial filter, or both, wherein transmitting the SRS during the DRX sleep period enables beam alignment for wakeup signal reception prior to a next DRX on-duration;

receive a control signal using a corresponding receive beam, or a receive spatial filter, or both; and receive, via scrambled DCI associated with the wakeup signal, an indication that configures a spatial filter relationship between the SRS resource used during the DRX sleep period and the receive beam or receive spatial filter used for wakeup signal monitoring.

8. The UE of claim 7, wherein the control signal is received using a plurality of control resource sets, and each control resource set of the plurality of control resource sets is assigned to a beam, or a spatial filter, or both corresponding to the SRS.

9. The UE of claim 7, wherein the control signal is received using a plurality of search spaces, and each search space of the plurality of search spaces is assigned to a beam, or a spatial filter, or both corresponding to the SRS.

10. The UE of claim 7, wherein the control signal is received using a plurality of monitoring occasions, and each monitoring occasion of the plurality of monitoring occasions is assigned to a beam, or a spatial filter, or both corresponding to the SRS.

11. The UE of claim 7, wherein the at least one processor is configured to cause the UE to activate a semi-persistent SRS resource during the DRX sleep period implicitly, and deactivate the semi-persistent SRS resource during a DRX on-period.

12. The UE of claim 7, wherein the at least one processor is configured to cause the UE to activate a semi-persistent SRS resource during the DRX sleep period using a medium access control (MAC) control element (CE) in a previous DRX on-duration period.

13. The UE of claim 7, wherein the at least one processor is configured to cause the UE to start SRS beam sweeping based on a beam, or a spatial filter, or both previously used to receive a physical downlink control channel (PDCCH) transmission in a previous DRX on-period.

14. The UE of claim 13, wherein a measurement corresponding to the beam, or the spatial filter, or both is above a predetermined threshold.

15. The UE of claim 7, wherein the at least one processor is configured to cause the UE to, in response to failing to decode the control signal using a configured beam in at least one monitoring occasion, implicitly trigger SRS transmission for beam alignment.

16. The UE of claim 7, wherein the at least one processor is configured to cause the UE to receive a first physical downlink control channel (PDCCH) in a next occurrence of a DRX on-period using a beam, or a spatial filter, or both used for receiving the control signal.

17. The UE of claim 7, wherein the control signal comprises a DCI wakeup signal.

18. A base station, comprising:

at least one memory; and at least one processor coupled with the at least one memory and configured to cause the base station to:

transmit a discontinuous reception (DRX) configuration comprising a slot offset, an on-duration, and a periodicity;

transmit a wakeup signal configuration comprising a wakeup signal offset, or a monitoring occasion, or both, wherein the wakeup signal configuration is received using scrambled downlink control information (DCI) signaling;

transmit information indicating to transmit a sounding reference signal (SRS) during a DRX sleep period in a SRS resource using a transmit beam, or a transmit spatial filter, or both, wherein transmitting the SRS during the DRX sleep period enables beam alignment for wakeup signal reception prior to a next DRX on-duration;

a control signal using a corresponding receive beam, or a receive spatial filter, or both; and transmit, via scrambled DCI associated with the wakeup signal, an indication that configures a spatial filter relationship between the SRS resource used during the DRX sleep period and the receive beam or receive spatial filter used for wakeup signal monitoring.

19. The base station of claim 18, wherein the control signal is received using a plurality of control resource sets, and each control resource set of the plurality of control resource sets is assigned to a beam, or a spatial filter, or both corresponding to the SRS.

20. The base station of claim 18, wherein the control signal is received using a plurality of search spaces, and each search space of the plurality of search spaces is assigned to a beam, or a spatial filter, or both corresponding to the SRS.

* * * * *